United States Patent [19]
Dietz et al.

[11] 4,217,265
[45] Aug. 12, 1980

[54] PIGMENT PREPARATIONS

[75] Inventors: Erwin Dietz, Kelkheim; Otto Fuchs; Robert Gutbrod, both of Frankfurt am Main; Adolf Kroh, Selters; Michael Maikowski, Frankfurt am Main, all of Fed. Rep. of Germany

[73] Assignee: Hoechst Aktiengesellschaft, Frankfurt am Main, Fed. Rep. of Germany

[21] Appl. No.: 922,437

[22] Filed: Jul. 6, 1978

[30] Foreign Application Priority Data

Jul. 9, 1977 [DE] Fed. Rep. of Germany ....... 2731175

[51] Int. Cl.² .......................... C08J 3/20; C09D 3/00; C09D 11/02; C09B 67/00
[52] U.S. Cl. .................................. 260/42.21; 106/22; 106/23; 106/32; 106/308 R; 106/308 Q; 106/308 F; 106/308 N; 106/308 S; 106/309; 106/310; 106/311; 260/29.6 MQ; 260/29.6 MN; 260/29.6 ME; 260/31.4 R; 260/31.8 R; 260/32.6 R; 260/32.8 R; 260/33.4 R; 260/33.6 R; 260/33.6 UA; 260/33.8 R; 260/139 P; 260/370; 260/33.8 UA
[58] Field of Search ........... 106/308 R, 308 Q, 308 F, 106/308 N, 308 S, 309, 310, 311, 22, 23, 32; 260/42.21

[56] References Cited
U.S. PATENT DOCUMENTS

| | | | |
|---|---|---|---|
| 2,291,452 | 7/1942 | Dahlen et al. | 106/308 |
| 3,681,099 | 8/1972 | Princen | 106/254 |
| 3,940,385 | 2/1976 | Smith | 260/23.7 A |
| 3,973,982 | 8/1976 | Bingham | 106/298 |

*Primary Examiner*—Carman J. Seccuro
*Attorney, Agent, or Firm*—Curtis, Morris & Safford

[57] ABSTRACT

Easily dispersible preparations of organic pigments are obtained by coating the pigment particles with essentially colorless aromatic compounds having a molecular structure being similar to that of the pigment and having an aliphatic chain of more than 5 carbon atoms. These preparations are stable to flocculation and useful for pigmenting hydrophilic and hydrophobic media.

23 Claims, No Drawings

PIGMENT PREPARATIONS

The present invention relates to pigment preparations.

The invention provides easily dispersible pigment preparations which are stable to flocculation and useful for the pigmenting of natural and synthetic materials.

The incorporation of pigments or pigment preparations into paint systems, printing inks and plastic materials often presents problems since many pigments can be finely dispersed and exhibit satisfactory general properties in the corresponding application medium only by using a complicated dispersion process. During and after the dispersion process flocculation phenomena can result in a change of viscosity of the application medium, shade alterations and losses in tinctorial strength (color depth), hiding power, gloss, homogeneity and brilliancy with the dyed materials.

Various processes have already been described to improve the pigment properties. In one process, pigments are treated with derivatives of the pigment molecules which were to improve the dispersibility of these pigments. When pigments modified in this manner are incorporated into a plastic material or a binder system, the strongly dyed soluble pigment derivatives can migrate to the interfaces of the system and dye adjacent substances. Moreover, pigment derivatives of this kind are prepared only under difficult reaction conditions and at a high cost, due to the poor solubility of the pigments. In addition, because of their strong color, the derivatives are only appropriate for use in pigments of the same color shade.

In accordance with the invention these problems are avoided by modifying the pigments using aromatic compounds having aliphatic carbon chains which are essentially colorless or only slightly colored and which may easily be prepared from readily obtainable substances.

The colorless or only slightly colored aromatic compounds of the invention having aliphatic carbon chains correspond to the formula I

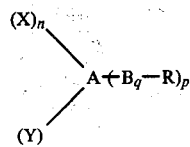

In this formula

A represents a homo- or heterocyclic aromatic ring system having at least 9 ring atoms and more than one ring, B represents bivalent linking groups, preferably —O—, —NR'—, —S—, —CO—, —SO$_2$—, —CR'R"—,

or a combination of these groups, such as —COO—, —O—CO—, —CO—NR'—, —NR'—CO—, —SO$_2$—NR'—, —NR'—SO$_2$—, —NR'—CO—NR"—,

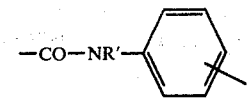

or —CO—NR'—CH$_2$—CO—NR"—, in which R' and R" stand for H or a short-chain alkyl radical having from 1 to 4 carbon atoms, R represents aliphatic carbon chains of more than 5 carbon atoms, especially alkyl, alkenyl or alkapolyenyl radicals having preferably from 8 to 25 carbon atoms, with several radicals possibly being linked with one another and/or the aliphatic radicals being unsubstituted or substituted by hydroxy and/or carboxy groups, X and Y, which are independent of each other, represent any substituents, such as —R', halogen, —OR', —NR'R", —COOR', —CONR'R", —NR'—CO—R", —SO$_2$NR'R", —SO$_3$M, —NO$_2$, —CN, —CF$_3$, in which R' and R" stand for H or a short-chain alkyl radical of from 1 to 4 carbon atoms and M is one molar equivalent of a mono- to trivalent cation, n and m, which are independent of each other, represent 0, 1 or 2 and p represents integers of from 1 to 4, preferably 1 and 2, and q is the integer 0 or 1, A and R being directly bonded when q is 0.

For the pigment preparations of the invention there are suitable organic pigments, for example azo pigments, azaporphines, quinacridones, flavanthrones, anthanthrones and pyranthrone compounds, derivatives of naphthalenetetracarboxylic acid, of perylene-tetracarboxylic acid, of thioindigo, of dioxazine and tetrachloroisoindoline, laked pigments, such as Mg, Ca, Ba, Al, Mn and Ni lakes of acid group-containing dyestuffs, as well as corresponding pigment mixtures.

The compounds I contained in the pigment preparations of the invention may be prepared according to known processes from simple aromatic compounds, preferably their derivatives with reactive groups, for example —OH, —NHR', —SH, —COOR', —COCl and —SO$_2$Cl by their reaction with alkyl compounds, preferably fatty acids and the derivatives thereof, such as fatty acid chlorides, fatty acid esters, fatty acid anhydrides, fatty amines, fatty alcohols and fatty isocyanates. Especially useful aromatic compounds are naphthalene, anthracene, phenanthrene, pyrene, chrysene, biphenyl, indole, quinoline, acridine, carbazole, diphenylene oxide, diphenylene sulfide, anthraquinone, and above all the corresponding substitution products carrying —OH, —SH, —NHR', —COOR', —COCl or —SO$_2$Cl groups on the ring which may react with fatty acids or the derivatives thereof. Of the numerous fatty acids and natural fatty acid mixtures as well as their derivatives, the most important representatives are, for example, caprylic acid, capric acid, lauric acid, myristic acid, palmitic acid, stearic acid, arachidic acid, behenic acid, palmitoleic acid, oleic acid, linoleic acid, linolenic acid, erucic acid, ricinoleic acid, coconut oil fatty acid, linseed oil fatty acid, ricinene fatty acid, castor oil fatty acid, sunflower seed oil fatty acid, tall oil fatty acid, as well as the fatty acid esters, fatty acid chlorides, fatty acid anhydrides, fatty alcohols and fatty amines which can be prepared thereof, the isocyanates that can be obtained from the fatty amines, and the oligomerized fatty acids which may be prepared from the unsaturated fatty acids. Besides the fatty acids also useful are alkyl benzoic acids, alkyl anilines, such as dodecyl aniline, and resin acids, as well as the derivatives that may be prepared therefrom.

Of the compounds I especially suitable for the preparation of the pigment preparations of the invention are those combinations of the pigment and compounds I in which the aromatic ring system of compound I shows a structure which is identical or similar to a section of the ring system of the organic pigment molecule. This selective principle is illustrated by some structural examples. However, it should be understood that there are numerous other combinations which are possible.

The properties of pigment preparations could be markedly improved, when to a red pigment having the following structural formula

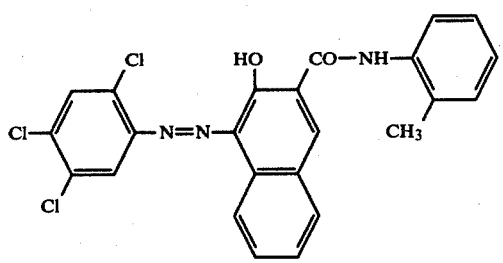

is added alkyl-aromatic compounds on which a naphthalene ring is substituted before or during the preparation. The following are examples of such compounds:

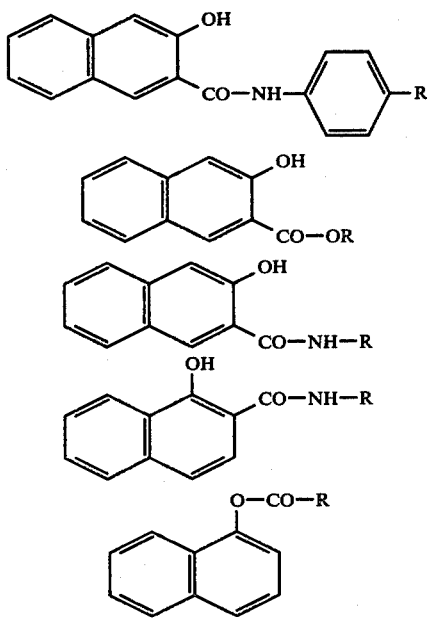

wherein

R is a hydrocarbon radical having from 8 to 25 carbon atoms.

For a violet pigment having the structural formula

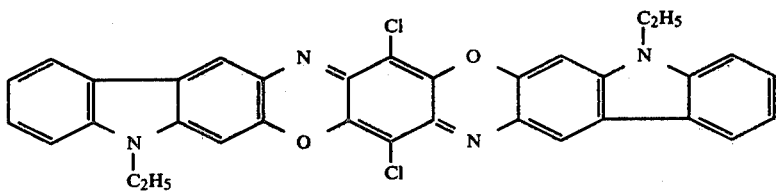

there may be successfully used alkyl aromatic compounds having the following structure:

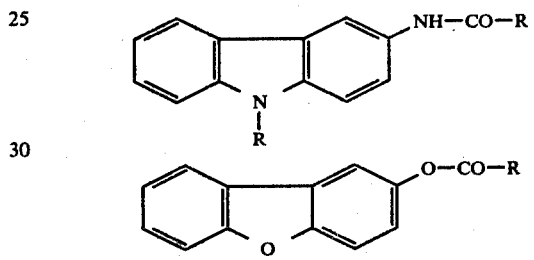

wherein
R is a hydrocarbon radical having from 8 to 25 carbon atoms, and R' is H or an alkyl radical of from 1 to 4 carbon atoms.

For an orange pigment having the following formula

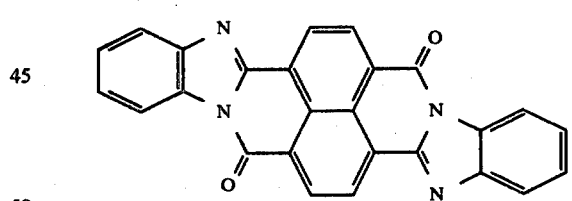

the following alkyl-aromatic compounds proved to be suitable:

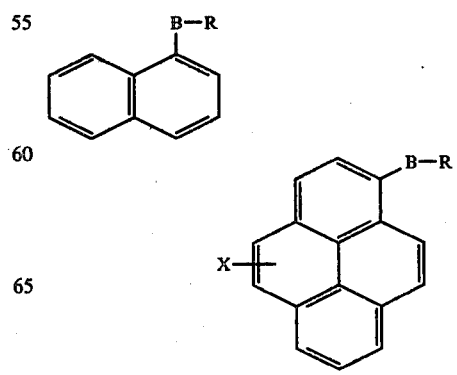

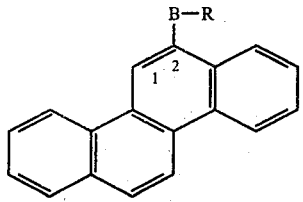

wherein
R is a hydrocarbon radical of from 8 to 25 carbon atoms, B is a bivalent linking group, such as —NH—CO—, —CO—NH—, —CO—O—, —NH—CO—NH—, —CO—, and
X is H or a functional group, such as —NO₂, —O—CH₃.

The effect of compounds I is probably due to the formation of adsorption layers of these compounds on the pigment surfaces which prevent an agglomeration of the pigment particles. It is a pre-condition for the formation of adsorption layers of this kind that the aromatic ring systems of the pigment molecules are easily accessible. In addition, the adsorption of the compounds I on the pigment surface may be influenced by varying the substituents at the aromatic ring.

Preferred pigment preparations contain from 0.2 to 45% by weight, preferably from 1 to 25% by weight, of compounds I, calculated on the pigment. These pigment preparations may be used in a solid form or may be brought into a liquid to pasty form by means of organic liquids, a dilution to any degree being possible. Besides pigments and compounds I, preferred pigment dispersions contain—with a high pigment content and good rheological properties—from 5 to 95% by weight of organic liquids or solutions. The pigment content of preferred dispersions may be in the range of from 1 to 70% by weight, preferably from 5 to 40% by weight, depending on the desired viscosity. Preferred solid preparations, for example pulverulent preparations contain from 70 to 99.8% by weight, preferably from 80 to 99% by weight, of organic pigments.

Organic liquids which may be used in addition to the compounds I, are solvents and liquids which have proved to be suitable for use in the fields of processing plastics, printing and painting and in which the compounds I are soluble. Examples of these solvents are:

Aromatic and aliphatic hydrocarbons, such as xylene, toluene, petroleum ether, white spirit, cyclohexane, halogenated hydrocarbons, such as methylene chloride, trichloroethylene, trichloroethane or chlorobenzene, alcohols, such as ethanol, butanol or cyclohexanol, ketones, such as ethylmethylketone or cyclohexanone, esters, such as ethyl- and butyl acetate, glycol ethers and esters, such as ethyl glycol, butyl glycol, ethyl diglycol, ethyl diglycol acetate, hexyl diglycol and ethylene glycol acetate, acid amides, such as N-methyl pyrrolidone and dimethylformamide, as well as mixtures of these solvents. However, there may also be used oils, such as linseed oil, castor oil and oleic acid, or plasticizers, such as dioctyl phthalate, dibutyl phthalate and trioleyl phosphate. The solvents may also have other substances dissolved or dispersed therein, for example, binding agents which are used in paint systems or printing inks, such as alkyd resins, alcrylic resins, nitrocellulose resins, urea-formaldehyde resins, melamine-formaldehyde resins and other resins.

The application of the compounds I onto the pigments may be effected by simply adding the compounds I and optionally further components during the preparation of the pigments or in a subsequent finishing process. However, the pigment compositions may also be prepared by a dispersing process and may be combined with a treatment for the formation of the particle size distribution and/or the crystal structure of the pigments.

Depending on the hardness of the pigment grains used, the dispersion and comminution processes are effected in a known manner, for example with saw tooth stirrers (dissolvers), rotor-stator mills, high-speed turbulent mixers, ball, sand or bead mills, in kneading units or on roller mills. The liquid to pasty dispersions prepared in this manner contain the pigment in a finely divided form and may be used for any purpose for which dispersions are commonly used. If the dispersions contain volatile solvents, they may be dried and ground as required, in order to obtain easily dispersible pigments which are stable to flocculation.

The pigment preparations claimed are suitable for pigmenting and dyeing natural and synthetic materials. They are particularly valuable for preparing paints and printing inks as well as for dyeing plastic materials and high-molecular-weight materials.

A particularly preferred embodiment of the invention is one in which the pigment dispersions contains additional surfactants and water and/or additives to retard drying up. Dispersions of this kind are also appropriate for pigmenting hydrophilic systems.

Suitable surfactants are all known anionic, cationic and non-ionic surface-active substances, anionic and non-ionic compounds being preferred. Those surfactants which possess one or several medium or long-chain hydrocarbon radicals have proved to be especially suitable. A few examples of the great number of these compounds are alkyl sulfates, alkyl sulfonates, alkyl phosphates, alkyl-benzene sulfonates, especially lauryl sulfate, stearyl sulfate, dodecyl sulfonates, octadecyl phosphates, and dodecyl-benzene sulfonates; condensation products from fatty acid and taurine and hydroxyethane-sulfonic acid; alkoxylation products of alkyl phenols, fatty alcohols, fatty amines, fatty acids and fatty acid amides, especially reaction products of nonyl phenol, dodecyl phenol, lauryl alcohol, coconut oil fatty alcohol, stearyl alcohol, oleyl alcohol, coconut oil fatty amine, tallow fatty amine, stearylamine, oleylamine, coconut oil fatty acid, stearic acid or oleic acid and 2 to 100 moles, preferably 5 to 30 moles of ethylene oxide; reaction products of ethoxylated alkyl phenols and fatty alcohols with chlorosulfonic acid and phosphorus oxychlorides. As cationic surfactants there may be mentioned quaternary ammonium salts, such as hexadecyl-trimethyl-ammonium chloride and dodecyl-pyridinium chloride. The above-mentioned surfactants may be used by themselves or in a mixture.

If for the preparation of the pigment dispersions contains compounds I and surfactants which possess identical or substantially similar aliphatic radicals are used, dispersions having particularly good properties are obtained.

Additives to the pigment dispersions which prevent or retard the drying-up of the pigment dispersions are those which are completely or partly miscible with water, for example, glycols, glycol ethers, polyhydric alcohols and acid amides, especially ethylene-glycol, propylene-glycol, butylene-glycol, hexylene-glycol, diethylene-glycol, dipropylene-glycol, polyethylene-glycols, polypropylene-glycols, ethyl diglycol, glycerol, trimethylol propane, formamide, and N-methylpyrrolidone. These additives may be used by themselves or in admixture with one another or with water.

Preferred surfactant-containing pigment dispersions contain, calculated on their weight, from 5 to 60% of pigment, from 0.1 to 7%, preferably from 1 to 5%, of compounds I, from 3 to 30%, preferably from 5 to 20%, of anionic, cationic or non-ionic surfactants as well as from 40 to 80% of water and/or additives retarding the drying-up. The pigment dispersions may also contain preservatives and foam-reducing substances.

Compared with common pigment dispersions, the surfactant-containing pigment dispersions are distinguished additionally by excellent stability to flocculation in numerous aqueous emulsion paints and especially in cellulose ether-containing plastics dispersions. If surfactants which are compatible with hydrophilic and hydrophobic binding agent systems are also used, pigment dispersions can be prepared that are stable to flocculation in hydrophobic and hydrophilic media. These compositions make it possible to produce the full tinctorial strength and brilliancy of the pigments in the dispersion process and to stabilize the pigments in the pigment dispersions for prolonged storage periods. The pigment dispersions also exhibit excellent rheological properties, even with a high pigment content, as well as particularly favorable distribution capacity in the various application media.

From the great number of paints and printing inks, as well as plastic materials, five media are selected, as examples of the pigment preparations claimed. However, this selection does not represent any limitation of numerous other applications in the fields of paints, prints and plastic materials.

A. Polyvinyl chloride coating paste containing 1 part of stabilized rutile pigment, 59.3 parts of an emulsion PVC which can be processed into a paste and which has a K value according to DIN 53 726 of 72 (®Hostalit P), 39.6 parts of dioctyl phthalate and 0.1 part of stabilizer.

B. Outdoor paint having a base of a vinyl-toluene acrylate copolymer containing 15 parts of stabilized rutile pigment, 34 parts of extender pigments (predominantly dolomite), 7 parts of a commercial vinyl-toluene acrylate copolymer suitable for outdoor paintings (®Pliolite VTAC-L), 14 parts of a 10% solution of a modified commercial vinyl-toluene acrylate copolymer (Pliolite AC-3) suitable for outdoor paintings in a mixture of aromatic and aliphatic hydrocarbons, and 30 parts of a mixture of a stabilizing agent, chloroparaffin and white spirit.

C. Air-drying alkyd resin lacquer containing 30 parts of stabilized rutile pigment, 37.5 parts of long-oil alkyd resins having a base of vegetable fatty acids, 32.5 parts of a mixture of drying substances, stabilizers, white spirit and crystal oil.

D. Emulsion paint having a base of polyvinyl acetate containing 20 parts of stabilized rutile pigment, 24 parts of extender pigments (predominantly dolomite), 40 parts of a commercial polyvinyl acetate dispersion suitable for emulsion paints (®Mowilith DM2HB) and 0.16 part of a methyl-hydroxyethyl cellulose which has an average viscosity of 2 Pas in a 2% aqueous solution at 20° C., the balance of 15.84 parts being water and the common stabilizers.

E. Emulsion paint having a base of acrylic resin containing 20 parts of stabilized rutile pigment, 24 parts of extender pigments (predominantly dolomite), 40 parts of a commercial acrylic resin dispersion (®Rhoplex AC34) suitable for emulsion paints, as well as 0.33 part of a methylhydroxyethyl cellulose having an average viscosity of 4 Pas in a 2% aqueous solution at 20° C., the balance of 15.67 parts being water and the common stabilizers.

For the suitability tests the liquid pigment preparations specified in the following Examples are introduced into one or more of the test media while stirring with an impeller stirrer for 5 minutes at 1800 rpm. Surfactant-containing pigment dispersions are stirred into test media B to E by hand for 3 minutes using a glass rod provided with a rubber cap. Unless otherwise indicated, solid pigment preparations are stirred into one of the test media by means of a saw tooth stirrer (dissolver) for 30 minutes at a circumferential speed of 24 m/sec. The concentration of the pigment preparation in colored test medium A is chosen such that a proportion of $TiO_2$ pigment to color pigment of 25:1 is obtained. In test media B to E a proportion of 50:1 is obtained. Subsequently the test medium is applied with a film applicator (hand coater) onto art printing cardboard.

In order to test the distribution capacity and/or the stability to flocculation, part of the film of test media B to E is rubbed for a short period with a brush or with the finger after drying. If the pigment preparation is difficult to distribute in the test medium or a flocculation process took place during stirring, agglomerated pigment particles are at least partially deagglomerated by the shearing forces exerted on the film. As a result the rubbed area has a more intense color than the area which has not been rubbed. This "rub-out" test is suitable as a simple test method for pigment preparations.

The following Examples serve to illustrate the invention, the parts being by weight. Colour Index numbers refer to the 3rd Edition.

EXAMPLE 1a

In a double trough kneader, 205 parts of C.I. Pigment Orange 43 (Colour Index No. 71 105) are kneaded together with 40 parts of N-3-pyrenyl-oleamide and 185 parts of dioctyl phthalate for 1 hour and subsequently diluted with 570 parts of dioctyl phthalate to give a free-flowing pigment preparation. When this preparation is introduced into test medium A by stirring, applied onto enamel board and heated for 5 minutes to 160° C., a brilliant dyeing of a very high color strength is obtained.

COMPARISON TEST 1b

If in Example 1a the 40 parts of N-3-pyrenyl-oleamide are replaced by 40 parts of dioctyl phthalate, dyeings of a duller shade are obtained which show a considerably reduced color strength.

EXAMPLE 2

In accordance with Example 1a, a pigment preparation is prepared which contains the following components:

200 Parts of C.I. Pigment Orange 43 (Colour Index No. 71 105), 30 parts of N-3-pyrenyl-oleamide and 770 parts of trioleyl phosphate. This pigment preparation having good flow properties can be distributed very easily in test medium B. The area of the dyeing that has been subsequently rubbed does not show a higher color strength (tinctorial strength) than the untreated area.

EXAMPLE 3a

According to Example 1a, a pigment preparation is prepared which contains the following components:
138 Parts of C.I. Pigment Orange 43 (Colour Index No. 71 105), 20 parts of N-3-pyrenyl-oleamide and 842 parts of an addition product of 2 moles of ethylene oxide to 1 mole of hexanol-(1). If this pigment preparation having favorable flow properties is stirred into test medium B, deep dyeings are obtained which show only a very insignificant increase in color strength after having been rubbed.

COMPARISON TEST 3b

If in Example 3a the 20 parts of N-3-pyrenyl-oleamide are replaced by 20 parts of an addition product of 2 moles of ethylene oxide to 1 mole of hexanol-(1), a preparation is obtained which is far more difficult to distribute in test medium B and whose dyeings show a markedly reduced color strength.

EXAMPLE 4a

100 Parts of C.I. Pigment Orange 43 (Colour Index No. 71 105) are introduced portionwise, while stirring, into a solution of 10 parts of N-3-pyrenyl-oleamide in 890 parts of ethanol. This mixture is dispersed in an agitation bead mill with 1 mm siliquartzite beads, until the particles have a size of less than 5 $\mu$m. Subsequently this dispersion is dried at 50° C. and ground. If the pigment preparation obained in this manner is introduced, while stirring, into test medium C by means of a dissolver, after 10 minutes of stirring very intensely colored and brilliant dyeings are obtained, which do not show any specks. The color strength cannot be further increased by rubbing the slightly dried film, nor by a subsequent dispersion of the dyed test medium in an attritor for a period of 60 minutes.

COMPARISON TEST 4b

If in Example 4a the 10 parts of N-3-pyrenyl-oleamide are replaced by 10 parts of ethanol, a pigment preparation is obtained which is extremely difficult to distribute in test medium C by means of a dissolver. The dyeings which show a very low color strength display numerous specks which are caused by undivided agglomerates. The area subsequently rubbed has a markedly stronger color shade than the untreated area. Even after a following dispersion treatment of the dyed test medium for a period of 60 minutes in an attritor the dyeings still show some specks and a color strength which is clearly inferior to that of the dyeings of Example 4a.

EXAMPLE 5a

In the same manner as indicated in Example 4a, a pigment preparation is prepared which contains the following components: 100 Parts of C.I. Pigment Orange 43 (Colour Index No. 71 105), 10 parts of N-3-pyrenyl-lauramide and 890 parts of butanol-(1). This dispersion can easily be incorporated into test medium C, to obtain strongly colored brilliant dyeings having an intensity of shade which does increase upon rubbing. If this dispersion is dried and ground, a pulverulent pigment preparation is obtained which has equally favorable properties as that of Example 4a.

EXAMPLE 5b

Almost equally favorable results are obtained, if in Example 5a the 10 parts of N-3-pyrenyl-lauramide are replaced by 10 parts of a condensation product of 1 mole of 3-pyrene-sulfochloride and 1 mole of oleylamine or a condensation product of 1 mole of 3,8-diamino-pyrene and 2 moles of oleic acid chloride.

EXAMPLE 6a

According to Example 4a a pigment preparation is prepared from the following components:
100 Parts of C.I. Pigment Orange 43 (Colour Index No. 71 105), 10 Parts of N-oleyl-pyrene-3-carboxylic acid amide and 890 parts of n-butyl acetate. The dried and ground pulverulent pigment preparation can easily be incorporated into test medium C by means of a dissolver and results in strongly colored brilliant dyeings in which the subsequently rubbed areas do not show any higher color strength than the untreated dyed areas.

Equally favorable results are obtained, if in a manner analogous to that of Example 6a pulverulent pigment preparations are prepared from the following starting compounds:

EXAMPLE 6b

100 Parts of C.I. Pigment Orange 43 (Colour Index No. 71 105), 10 parts of a pyrene derivative carrying a —NH—CO—CH$_2$-N(CH$_3$)-CO-oleyl radical in the 3-position, and 890 parts of butanone-(2).

EXAMPLE 6c

100 Parts of C.I. Pigment Orange 43 (Colour Index No. 71 105), 10 parts of a condensation product of 3-amino-pyrene and ricinoleic acid and 890 parts of butanol.

EXAMPLE 7a

100 Parts of C.I. Pigment Orange 43 (Colour Index No. 71 105) are introduced portionwise into a solution of 10 parts of a condensation product of 1 mole of 3-aminopyrene and 1 mole of ricinene fatty acid *) in 890 parts of butyl glycol and are subsequently dispersed in an agitation bead mill with 1 mm siliquartzite beads, until the particles have a size of less than 5 $\mu$m. The dispersion having favorable flow properties can easily be introduced while stirring into test medium C, to obtain strongly colored brilliant dyeings in which subsequently rubbed areas have a shade that is only slightly stronger than that of the untreated areas.

(*) In the condensation reaction which leads to the corresponding compound I, the fatty acid radicals react with one another by forming addition products, so that in the reaction product employed the fatty acid radicals are at least partially linked to one another.

EXAMPLE 7b

A pigment preparation with shows equally flavorable properties as that of Example 7a is obtained when a dispersion is prepared in accordance with Example 7a from the following components:
100 Parts of C.I. Pigment Orange 43 (Colour Index No. 71 105), 10 parts of N-octadecyl-N'-3-pyrenyl-urea and 890 parts of ethyl glycol.

EXAMPLE 7c

Even more favorable test results are obtained, if a pigment preparation is prepared according to Example 7a, while using 100 parts of C.I. Pigment Orange 43 (Colour Index No. 71 105), 10 parts of N-(8-nitro-3-pyrenyl)-oleamide and 890 parts of xylene.

EXAMPLE 7d

A dispersion which is prepared in a manner analogous to that of Example 7a and which contains additionally 100 parts of C.I. Pigment Orange 43 (Colour Index No. 71 105) 10 parts of N-1-naphthyl-oleamide and 890 parts of petroleum ether (boiling range 60° to 90° C.) shows properties that are comparable to those of Example 7c.

EXAMPLE 8

According to Example 7a a pigment preparation is prepared from 100 parts of C.I. Pigment Orange 43 (Colour Index No. 71 105), 10 parts of N-2-chrysenyl-oleamide and 890 parts of 1,1,1-trichloroethane. The dispersion which has advantageous flow properties can easily be stirred into test medium B to obtain deep brilliant dyeings. The areas which have been subsequently rubbed do not show a higher color intensity when compared with the untreated areas.

EXAMPLE 9

In accordance with Example 7a a pigment dispersion is prepared from 150 parts of C.I. Pigment Orange (Colour Index No. 71 105), 15 parts of a condensation product of 3-aminopyrene, naphthenic acid and 835 parts of xylene. The free-flowing pigment preparation results in test medium C in deep brilliant dyeings, the color intensity of which can only be increased to an insignificant degree by subsequent rubbing.

EXAMPLE 10

In a manner analogous to that of Example 7a a pigment preparation is prepared from 10 parts of 2,9-dimethyl-quinacridone, 10 parts of a condensation product of 1 mole of the sodium salt of 1-amino-naphthalene-4-sulfonic acid and 1 mole of oleic acid chloride and 890 parts of N-methyl-pyrrolidone. The free-flowing and slightly thixotropic pigment dispersion can be very easily introduced by stirring into test media B and C. In the course of this process brilliant dyeings of a very high color intensity (tinctorial strength) are obtained, which color intensity cannot be increased by subsequent rubbing.

EXAMPLE 11

In the same manner as has been described in Example 7a, a dispersion is prepared from 100 parts of C.I. Pigment Yellow 83 (Colour Index No. 21 108), 10 parts of a reaction product of 1 mole of 3,3'-dichloro-4,4'-diaminodiphenyl with 1 mole of acetyl chloride and 1 mole of oleic acid chloride, 80 parts of dimethylformamide and 810 parts of ethanol. The free-flowing dispersion can be stirred very easily into test medium B. The dyeings show a high color intensity and brilliancy. The areas which have been rubbed afterwards do not show a higher color strength than the untreated areas.

EXAMPLE 12

150 Parts of C.I. Pigment Violet 23 (Colour Index No. 51 319) having been modified in the finishing process with 7% by weight of N-(9-ethyl-3-carbazyl)-oleamide are kneaded in a double trough kneader for 1 hour together with 90 parts of dioctyl phthalate and subsequently diluted with 760 parts of dioctyl phthalate to give a pigment preparation having favorable flow properties. When this preparation is introduced by stirring into test medium A, applied onto enamel board and heated for 5 minutes to 160° C., a brilliant dyeing is obtained which has a very high color strength.

EXAMPLE 13a

In accordance with Example 7a, a pigment preparation is prepared from 100 parts of C.I. Pigment Violet 23 (Colour Index No. 51 319), 10 parts of a condensation product of 3-hydroxy-diphenylene oxide and oleic acid chloride and 890 parts of butanol. The dispersion having favorable flow properties can easily be stirred into test medium C and leads to deep brilliant dyeings. Subsequent rubbing produces a color shade which is only slightly deeper that that of the untreated areas.

EXAMPLE 13b

A dispersion showing even more favorable properties is obtained, if in Example 13a the 10 parts of the condensation product of 3-hydroxydiphenylene oxide and oleic acid chloride are replaced by 10 parts of N-(9-ethyl-3-carbazyl)-oleamide.

EXAMPLE 14a

In a manner analogous to that described in Example 7a, a pigment dispersion is prepared from 150 parts of C.I. Pigment Red 112 (Colour Index No. 12 370), 15 parts of N-oleyl-2-hydroxy-3-naphthoic acid amide and 835 parts of butanol. This dispersion has favorable rheological properties and can easily be distributed in test medium C. The subsequently rubbed area of the strongly colored dyeing has a color shade which is only slightly deeper than that of the untreated area.

EXAMPLE 14b

Dispersions having equally favorable properties are obtained, if in Example 14a the 15 parts of N-oleyl-2-hydroxy-3-naphthoic acid amide are replaced by the same amount of condensation products of 2-hydroxy-3-naphthoic acid and dodecyl aniline or oleyl alcohol, or of 1-hydroxy-2-naphthoic acid and oleylamine or of 1-naphthol and oleic acid chloride.

EXAMPLE 15

200 Parts of C.I. Pigment Orange 43 (Colour Index No. 71 105) are kneaded for 1 hour with 35 parts each of pyrene compounds carrying in the 3-position the substituents indicated in the following Table and about 130 parts of a total of 180 parts of an addition product of 10 moles of ethylene oxide to 1 mole of nonyl phenol. These kneaded compositions are subsequently diluted with the remaining parts of the addition product of 10 moles of ethylene oxide to 1 mole of nonyl phenol, 385 parts of ethylene glycol, 198 parts of water and 2 parts of preservative to give pigment dispersions having properties as described in the following Table. The rheological properties of the dispersions as well as the stability to flocculation in the test media are rated from 1 to 6:

1 = excellent,
2 = very good,
3 = good,
4 = moderate,

5=poor,
6=very poor.

| Ex. No. 15 | substituent at the pyrene ring | rheological properties of the pigment dispersion | stability to flocculation in medium E | stability to flocculation in medium C |
|---|---|---|---|---|
| a | —NH—CO-lauryl | 4 (thixotropic) | 3 | 3 |
| b | —NH—CO-stearyl | 3 (slightly thix.) | 2 | 3 |
| c | —NH—CO-oleyl | 1 | 1 | 2 |
| d | —NH—CO-erucyl | 3 (slightly thix.) | 2 | 2 |
| e | —NH—CO-(naphthenic acid radical)* | 1 | 1 | 2 |
| f | —NH—CO-(linseed oil fatty acid radical)* | 2 | 1 | 2 |
| g | —NH—CO-(ricinene fatty acid radical)* | 1 | 1 | 2 |
| h | —NH—CO-(tall oil fatty acid radical)* | 1 | 1 | 3 |
| i | —NH—CO-(caster oil fatty acid radical)* | 2 | 1 | 3 |
| k | —NH—CO-(coconut oil fatty acid radical)* | 3 (slightly thix.) | 1 | 3 |
| l | —NH—CO-sebacyl | 3 (slightly thix.) | 3 | 3 |
| m | —NH—CO—CH$_2$—N(CH$_3$)—CO-oleyl | 1 | 1 | 3 |
| n | —NH—CO—NH-octadecyl | 4 (thixotropic) | 2 | 3 |
| o | —CO-stearyl | 3 (slightly thix.) | 2 | 3 |
| p | —CO—NH-oleyl | 1 | 2 | 2 |
| q | —CO—O-oleyl | 2 | 2 | 3 |
| r | 3—NH—CO-oleyl and 8-NO$_2$ | 4 (slightly thix.) | 2 | 2 |
| s | 3—NH—CO-oleyl and 8-NH—CO-oleyl | 1 | 1 | 2 |
| t | —NH$_2$ | 5 (thixotropic) | 5 (dull dyeings with a low color intensity) | 5 |

*The aliphatic hydrocarbon radicals of the natural fatty acid mixtures are termed fatty acid radicals for short in the Table. In the course of the reactions of unsaturated fatty acids to give the corresponding alkylaromatic compounds, products may be formed whose fatty acid radicals are linked with one another by the formation of addition products. This adduct formation is seen mostly in those derivatives which contain a tall oil, ricinene or linseed oil fatty acid radical.

If in Example 15c, 35 parts of the pyrene compound are replaced by 35 parts of a mixture of 3-aminopyrene and oleic acid in the molar ratio of 1:1 or by 35 parts of oleic acid or by 35 parts of ethylene glycol, dispersions are obtained whose flocculation stability and rheological properties are as poor as those of the dispersion of Example 15t.

In the dyeings of Example 15 the color strength and the brilliancy increase corresponding to the flocculation stability and reach a maximum in Examples 15c through 15g.

EXAMPLE 16

200 Parts of C.I. Pigment Orange 43 (C.I. No. 71 105) are kneaded with 40 parts of N-2-chrysenyl-oleamide, 100 parts of the sodium salt of a condensation product of oleic acid and methyl-taurine, 20 parts of sodium-lauryl sulfate, 180 parts of ethylene-glycol and 80 parts of water for 1 hour and are thereafter diluted with 260 parts of ethylene-glycol, 118 parts of water and 2 parts of a preservative, to give a pigment dispersion of very good flow properties which shows a good stability to flocculation in test media B and C.

EXAMPLE 17

200 Parts of C.I. Pigment Orange 43 (C.I. No. 71 105) are dispersed for 1 hour in the double trough kneader, while adding 30 parts of N-2-chrysenyl-oleamide and 120 parts of an addition product of 8 moles of ethylene oxide to 1 mole of oleyl alcohol. Subsequently, the kneaded material is diluted by adding 40 parts of an addition product of 8 moles of ethylene oxide to 1 mole of oleyl alcohol, 410 parts of ethylene-glycol, 198 parts of water and 2 parts of preservative, to give a dispersion having good flow properties not exhibiting the slightest flocculation phenomena when stirred into test media D and B. The dyeings are marked by a high brilliancy and color strength.

Almost equally favorable results are obtained, if in Example 17, 160 parts of the addition product of 8 moles of ethylene oxide to 1 mole of oleyl alcohol are replaced by 55 parts of an addition product of 5 moles of ethylene oxide to 1 mole of oleyl alcohol and by 105 parts of an addition product of 15 moles of ethylene oxide to 1 mole of stearyl alcohol, or by 160 parts of an addition product of 10 moles of ethylene oxide to 1 mole of oleylamine, or if 410 parts of ethylene-glycol are replaced by 410 parts of propylene-glycol. On the other hand, if 30 parts of N-2-chrysenyl-oleamide are replaced by 30 parts of an addition product of 8 moles of ethylene oxide to 1 mole of oleyl alcohol, a dispersion having poor flow properties is obtained which shows distinct flocculation phenomena when being stirred into media D and B, and whose dyeings are markedly weaker and have a duller shade than the dyeings described in Example 17.

EXAMPLE 18

According to Example 17, a dispersion is prepared from the following components:
200 Parts of C.I. Pigment Orange 43, (C.I. No. 71 105),
35 parts of N-1-naphthyl-oleamide,
180 parts of an addition product of 10 moles of ethylene oxide to 1 mole of oleyl alcohol,
385 parts of ethylene-glycol,
198 parts of water, and
2 parts of preservative.

This dispersion is distinguished by favorable rheological properties, a very good stability to flocculation in test media D and E, as well as by deep brilliant dyeings.

EXAMPLE 19

In a double trough kneader 200 parts of C.I. Pigment Violet 23 (C.I. No. 51 319) are kneaded for 1 hour with 20 parts of a condensation product of 3-hydroxy-diphenylene oxide and oleic acid chloride and 135 parts of an addition product of 10 moles of ethylene oxide to 1 mole of oleyl alcohol, and the composition obtained is subsequently diluted with 25 parts of an addition product of 10 moles of ethylene oxide to 1 mole of oleyl alcohol, 420 parts of ethylene-glycol, 198 parts of water and 2 parts of preservative, to give a free-flowing dispersion which exhibits a good stability to flocculation in test media D and E.

Dispersions having even more favorable properties are obtained, if in Example 19, 20 parts of the condensation product of 3-hydroxy-diphenylene oxide and oleic acid chloride are replaced by condensation products of 2-aminocarbazole or 3-amino-carbazole and oleic acid chloride.

EXAMPLE 20

315 Parts of C.I. Pigment Violet 23 (C.I. No. 51 319), to which 10% by weight of N-(9-ethyl-3-carbazyl-oleamide) have been added during the finishing process, are introduced by stirring portionwise into a solution of 60 parts of an addition product of 100 moles of ethylene oxide to 1 mole of nonylphenol, 60 parts of an addition product of 30 moles of ethylene oxide to 1 mole of nonylphenol, 280 parts of formamide, 283 parts of water and 2 parts of preservative. This mixture is ground in an agitation bead mill with 1 mm siliquartzite beads, until the particles have a size of less than 2 μm. The dispersion thus obtained is marked by very good rheological properties and a very good stability to flocculation in test media D and E.

EXAMPLE 21

In a double trough kneader 270 parts of C.I. Pigment Violet 23 (C.I. No. 51 319), to which 10% by weight of N-(9-ethyl-3-carbazyl)-oleamide have been added during the finishing process, are dispersed with 80 parts of an addition product of 15 moles of ethylene oxide to 1 mole of p-benzyl-o-phenylphenol, 20 parts of the sodium salt of the sulfuric acid semi-ester of an addition product of 5 moles of ethylene oxide to 1 mole of nonylphenol, 30 parts of glycerol and 20 parts of water for 1 hour. This kneaded composition is thereafter diluted with 80 parts of glycerol, 210 parts of ethylene-glycol, 288 parts of water and 2 parts of preservative to give a dispersion which has excellent rheological properties as well as a very good stability to flocculation in test media D and E.

EXAMPLE 22

In accordance with Example 21 a dispersion is prepared which contains the following components: 250 Parts of C.I. Pigment Violet 23 (C.I. No. 51 319), to which 10% by weight of N-(9-ethyl-3-carbazyl)-oleamide have been added during the finishing process, 90 parts of an addition product of 15 moles of ethylene oxide to 1 mole of oleyl alcohol, 280 parts of ethylene-glycol, 90 parts of hexylene-glycol, 288 parts of water and 2 parts of preservative. This dispersion exhibits excellent rheological properties and an excellent stability to flocculation in test media D and E. Furthermore, the dyeings are distinguished by a high color intensity and brilliancy.

EXAMPLE 23

300 Parts of C.I. Pigment Yellow 83 (Colour Index No. 21 108) are kneaded in a double trough kneader with 20 parts of a reaction product of 1 mole of 3,3'-dichloro-4,4'-diamino-diphenyl with 1 mole of acetyl chloride and 1 mole of oleic acid chloride, 40 parts of N-methyl-pyrrolidone, 100 parts of an addition product of 10 moles of ethylene oxide to 1 mole of oleyl alcohol and 90 parts of ethylene-glycol, and the composition obtained is then diluted with 180 parts of ethylene-glycol, 268 parts of water and 2 parts of preservative. The free-flowing and slightly thixotropic dispersion thus prepared shows a very good stability to flocculation in test media D and B.

Equally favorable results are obtained, if in Example 23, the 20 parts of the reaction product of 1 mole of 3,3'-dichloro-4,4'-diamino-diphenyl with 1 mole of acetyl chloride and 1 mole of oleic acid chloride are replaced by 20 parts of a reaction product of 1 mole of 3,3'-dimethyl-4,4'-diamino-diphenyl with 1 mole of acetyl chloride and 1 mole of oleic acid chloride, and the 270 parts of ethylene-glycol are replaced by 270 parts of diethylene glycol.

EXAMPLE 24

In a double trough kneader, 180 parts of 2,9-dimethylquinacridone are kneaded with 40 parts of a condensation product of the sodium salt of 1-naphthylamine-4-sulfonic acid and oleic acid chloride, 40 parts of an addition product of 10 moles of ethylene oxide to 1 mole of oleyl alcohol and 40 parts of diethylene-glycol for 1 hour. The kneaded composition is diluted by adding 80 parts of an addition product of 10 moles of ethylene oxide to 1 mole of oleyl alcohol, 320 parts of diethylene-glycol, 298 parts of water and 2 parts of preservative, to give a slightly thixotropic dispersion having very good flow properties. The dispersion exhibits good stability to flocculation in test medium C and an excellent stability in test medium D and produces deep and brilliant dyeings.

EXAMPLE 25

400 Parts of C.I. Pigment Blue 15:3 (C.I. No. 74 160) are kneaded for 1 hour together with 20 parts of N-(9-ethyl-3-carbazyl)-oleamide, 100 parts of an addition product of 10 moles of ethylene oxide to 1 mole of oleyl alcohol, 20 parts of the sodium salt of the dodecylbenzene-sulfonic acid and 85 parts of ethylene-glycol, and thereafter the composition is diluted with 175 parts of ethylene-glycol, 198 parts of water and 2 parts of preservative. In this manner, a dispersion having favorable rheological properties is obtained. The deep and brilliant dyeings show a good stability to flocculation in test medium C and an excellent stability in test medium E.

EXAMPLE 26

According to Example 25, a dispersion is prepared which contains the following components:

400 Parts of C.I. Pigment Red 112 (C.I. No. 12 370), 20 parts of a condensation product of 1 mole of 2-hydroxy-3-naphthoic acid and 1 mole of oleylamine, 100 parts of an addition product of 10 moles of ethylene oxide to 1 mole of oleyl alcohol, 240 parts of ethylene-glycol, 238 parts of water and 2 parts of preservative. This dispersion is distinguished by very good flow properties, a high stability to flocculation in test media B and E and by deep, brilliant dyeings.

Dispersions having almost equally favorable properties are obtained, if in Example 26 the 20 parts of the condensation product of 1 mole of 2-hydroxy-3-naphthoic acid and 1 mole of oleylamine are replaced by condensation products of 2-hydroxy-3-naphtoic acid and oleyl alcohol or dodecyl aniline; 1-hydroxy-2-naphthoic acid and oleylamine; or of 1-naphthol, 2-naphthol or 1-naphthylamine and oleic acid chloride.

We claim:

1. A pigment preparation containing (a) an organic pigment,
(b) a colorless or only slightly colored aromatic compound of the formula I

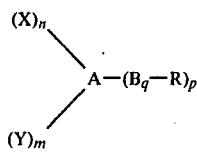

in which

A is an aromatic ring system having at least 9 ring atoms, more than one ring and being identical or similar to that part of the aromatic ring system of the pigment molecule, B represents bivalent linking groups, R represents aliphatic carbon chains of more than 5 carbon atoms which are unsubstituted or substituted by hydroxy and/or carboxy groups, X and Y, independent of each other, represent —R', halogen, —OR', —NR'R", —COOR', —CONR'R", —SO$_2$NR'R", —NR'—CO—R", —NO$_2$, —CN, —CF$_3$ or SO$_3$M, M being an equivalent of a mono- to trivalent cation, and R' and R", independent of each other stand for H or a short-chain alkyl radical having from 1 to 4 carbon atoms, n and m, independent of each other, are 0, 1 or 2, p is an integer of from 1 to 4, and q is the integer 0 or 1.

2. A pigment preparation as claimed in claim 1, wherein in the compound of the formula I B stands for —O—, —NR'—, —S—, —CO—, —SO$_2$—, —CR'R"—,

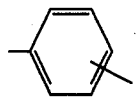

or for a combination of these groups, and R' and R" —independent of each other—stand for H or a short-chain alkyl radical having from 1 to 4 carbon atoms.

3. A pigment preparation as claimed in claim 1, wherein in the compound of formula I B contains a carbonamide, sulfonamide, ester or urea group.

4. A pigment preparation as claimed in claim 1, wherein in the compound of formula I X and Y, independent of each other, represent methyl, ethyl, chlorine, hydroxide, acylamino or sulfonate groups.

5. A pigment preparation as claimed in claim 1, wherein in the compound of formula I R consists of alkyl, alkenyl or alkapolyenyl radicals of from 8 to 25 carbon atoms, several of these aliphatic radicals possibly being linked with one another.

6. A pigment preparation as claimed in claim 1, wherein the compound of the formula I is obtainable by the reaction of aromatic amines, alcohols or carboxylic acids with fatty acids or the derivatives thereof.

7. A pigment preparation as claimed in claim 1, which contains additionally an organic liquid.

8. A pigment preparation, as claimed in claim 7, which contains additionally as an organic liquid, an oil.

9. A pigment preparation, as claimed in claim 7, which contains additionally as an organic liquid, an alkylene oxide addition product.

10. A pigment preparation, as claimed in claim 7, which contains additionally as an organic liquid a non-volatile or difficulty volatile organic liquid.

11. A pigment preparation as claimed in claim 7, which contains additionally as an organic liquid a plasticizer.

12. A pigment preparation as claimed in claim 7, which contains additionally as an organic liquid a medium to easily volatile organic solvent.

13. A pigment preparation as claimed in claim 7, which contains as a medium to easily volatile organic solvent an aliphatic, aromatic and optionally halogenated hydrocarbon, an alcohol, ketone, ether, ester or acid amide.

14. A pigment preparation as claimed in claim 1, which contains additionally surfactants, water and/or additives retarding the drying-up.

15. A pigment preparation as claimed in claim 14, which contains a liquid retarding the drying-up.

16. A pigment preparation as claimed in claim 14, whose surfactants are anionic and/or non-ionic.

17. A pigment preparation as claimed in claim 14, whose surfactants carry carbon chains having more than 7 carbon atoms.

18. A pigment preparation as claimed in claim 14, which contains polyhydric alcohols and/or acid amides as additives retarding the drying-up.

19. A pigment preparation as claimed in claim 14, which contains additionally a preservative.

20. A pigment preparation as claimed in claim 14, which contains additionally a defoaming agent.

21. A process for the pigmenting of hydrophobic materials which comprises incorporating into said material a pigment preparation as claimed in claim 1.

22. A process as claimed in claim 21, wherein the material is a paint, printing ink or a plastic material.

23. A process as claimed in claim 21 or 22, wherein the material is hydrophobic or hydrophilic.

* * * * *